United States Patent
Large et al.

(10) Patent No.: US 9,650,981 B1
(45) Date of Patent: May 16, 2017

(54) ADJUSTMENT OF MEASURED OXYGEN STORAGE CAPACITY BASED ON UPSTREAM O2 SENSOR PERFORMANCE

(71) Applicant: GM Global Technology Operations LLC, Detroit, MI (US)

(72) Inventors: Thomas J. Large, Ortonville, MI (US); Grant J. Ovist, Fenton, MI (US); Sharianne Ziola, Milford, MI (US); Timothy Wendling, New Lothrop, MI (US); J. Michael Gwidt, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/980,079

(22) Filed: Dec. 28, 2015

(51) Int. Cl.
    *F01N 3/00* (2006.01)
    *F02D 41/24* (2006.01)
    (Continued)

(52) U.S. Cl.
    CPC ........ *F02D 41/2474* (2013.01); *F01N 11/002* (2013.01); *F01N 11/007* (2013.01); *F01N 13/008* (2013.01); *F02D 41/0087* (2013.01); *F02D 41/0295* (2013.01); *F02D 41/2432* (2013.01); *F02M 35/1038* (2013.01); *F02M 35/10386* (2013.01); *F01N 2550/02* (2013.01);
    (Continued)

(58) Field of Classification Search
    CPC ............. F02D 41/2474; F02D 41/0295; F02D 41/1441; F02D 41/1456; F01N 11/007; F01N 13/008; F01N 3/101
    USPC ......................................... 60/274
    See application file for complete search history.

(56) References Cited

U.S. PATENT DOCUMENTS

| 6,324,893 B1 | 12/2001 | Watanabe et al. |
| 6,694,244 B2 | 2/2004 | Meyer et al. |

(Continued)

FOREIGN PATENT DOCUMENTS

| CN | 102116190 A | 7/2011 |
| CN | 102791982 A | 11/2012 |

OTHER PUBLICATIONS

U.S. Appl. No. 12/623,013, Wesley W. Wald.
(Continued)

*Primary Examiner* — Jason Shanske (57) ABSTRACT

A vehicle system includes an upstream oxygen monitoring module that monitors an upstream exhaust oxygen sensor and determines an upstream transition period based on a time at which the upstream exhaust oxygen sensor detects a rich-to-lean fueling transition. A delay determining module determines a delay period associated with the upstream exhaust oxygen sensor's detection of the fueling transition. An upstream correcting module determines a corrected upstream transition period based on the upstream transition period and the delay period. A downstream oxygen monitoring module monitors a downstream exhaust oxygen sensor and determines a downstream transition period based on the response of the downstream exhaust oxygen sensor to the fueling transition. An oxygen storage capacity (OSC) determining module determines an OSC period based on the corrected upstream transition period and the downstream transition period. A catalyst fault detection module selectively adjusts operating parameters of the engine based on the OSC period.

20 Claims, 5 Drawing Sheets

(51) Int. Cl.
*F01N 11/00* (2006.01)
*F01N 13/00* (2010.01)
*F02D 41/02* (2006.01)
*F02D 41/00* (2006.01)
*F02M 35/10* (2006.01)
*G01M 15/10* (2006.01)

(52) U.S. Cl.
CPC ..... *F01N 2560/025* (2013.01); *G01M 15/104* (2013.01)

(56) References Cited

U.S. PATENT DOCUMENTS

| | | |
|---|---|---|
| 6,802,181 B2 | 10/2004 | Wang et al. |
| 6,874,313 B2 | 4/2005 | Yurgil et al. |
| 7,111,451 B2 | 9/2006 | Dou et al. |
| 7,444,235 B2 | 10/2008 | Anilovich et al. |
| 7,707,821 B1 | 5/2010 | Legare |
| 7,900,439 B2 | 3/2011 | Genslak et al. |
| 8,516,796 B2 | 8/2013 | Wald et al. |
| 8,793,976 B2 | 8/2014 | Jeffrey et al. |
| 2003/0017603 A1 | 1/2003 | Uchida et al. |
| 2003/0159432 A1 | 8/2003 | Kobayashi et al. |
| 2004/0230366 A1 | 11/2004 | Ueda et al. |
| 2004/0244361 A1 | 12/2004 | Tanabe et al. |
| 2005/0076634 A1 | 4/2005 | Anilovich et al. |
| 2005/0132698 A1 | 6/2005 | Nagaoka et al. |
| 2005/0252196 A1 | 11/2005 | Aliakbarzadeh et al. |
| 2007/0227123 A1 | 10/2007 | Iida et al. |
| 2008/0115486 A1 | 5/2008 | Yurgil |
| 2008/0184695 A1 | 8/2008 | Anilovich et al. |
| 2008/0229727 A1* | 9/2008 | Wang ...................... F01N 11/00 60/273 |
| 2008/0302087 A1 | 12/2008 | Genslak et al. |
| 2008/0306673 A1 | 12/2008 | Yasui et al. |
| 2009/0030592 A1 | 1/2009 | Mitsutani |
| 2009/0266054 A1 | 10/2009 | Iihoshi et al. |
| 2009/0288391 A1 | 11/2009 | Aoki |
| 2009/0293451 A1 | 12/2009 | Kesse |
| 2010/0101214 A1 | 4/2010 | Herman et al. |
| 2010/0163008 A1* | 7/2010 | Kato ................... F02D 41/1458 123/674 |
| 2011/0138876 A1 | 6/2011 | Arlt et al. |
| 2012/0031170 A1* | 2/2012 | Matsumoto ........... F01N 11/007 73/30.01 |
| 2012/0131992 A1 | 5/2012 | Fushiki |
| 2012/0324869 A1 | 12/2012 | Nakamura |
| 2013/0054083 A1 | 2/2013 | Genslak et al. |
| 2013/0197782 A1* | 8/2013 | Genko ................ F02D 41/1454 701/103 |
| 2013/0206596 A1* | 8/2013 | Katsurahara ......... G01N 27/407 204/424 |
| 2015/0086428 A1* | 3/2015 | Kitaura ................ F01N 11/007 422/119 |
| 2015/0247434 A1* | 9/2015 | Hayashita ........... F02D 41/1454 60/285 |

OTHER PUBLICATIONS

U.S. Appl. No. 13/221,135, Genslak et al.
P. Rodatz, T. Arlt, B. Odendall, H. Schreiber, B. Kopp; "Robust oxygen sensor and catalyst monitor to reduce the 'gap'"; Presented at IAV GmbH 5th Conference: Apr. 14 and 15, 2011 in Braunschweig, Germany; 10 pages.

* cited by examiner

ADJUSTMENT OF MEASURED OXYGEN STORAGE CAPACITY BASED ON UPSTREAM O2 SENSOR PERFORMANCE

FIELD

The present disclosure relates to internal combustion engine diagnostics, and more particularly to in-vehicle performance diagnostics for engine catalysts.

BACKGROUND

Regulations set forth malfunction criteria for engine systems. Among those is the requirement that the on-board diagnostics (OBD) system monitor the functions and conditions of the emissions control system, including engine catalysts (also known as catalytic converters). Engine catalysts reduce exhaust emissions by chemically converting exhaust into less harmful byproducts. Engine catalysts store oxygen, usually while the system is running fuel lean (oxygen rich). The stored oxygen is later released to compensate for a lack of oxygen while the system is running fuel rich (oxygen lean).

Oxygen storage capacity (OSC) refers to an engine catalyst's ability to store oxygen. Oxygen sensors located before and after an engine catalyst monitor the oxygen concentration of exhaust entering and exiting the catalyst. The oxygen sensors supply feedback signals relative to the oxygen concentration of the exhaust to the engine control module (ECM). The collected data is used to calculate the OSC, which is then used to monitor the performance of an engine catalyst.

SUMMARY

A system for a vehicle includes an upstream oxygen monitoring module that monitors an upstream oxygen sensor and determines an upstream transition period based on a time at which the upstream oxygen sensor detects a rich-to-lean fueling transition. The upstream oxygen sensor monitors an oxygen concentration of an exhaust stream prior to an engine catalyst. The system includes a delay determining module that determines a delay period associated with the upstream oxygen sensor's detection of the rich-to-lean fueling transition. The system includes an upstream correcting module that determines a corrected upstream transition period based on the upstream transition period and the delay period. The system includes a downstream oxygen monitoring module that monitors a downstream oxygen sensor and determines a downstream transition period based on the response of the downstream oxygen sensor to the rich-to-lean fueling transition. The downstream oxygen sensor monitors the oxygen concentration of the exhaust stream following the engine catalyst. The system includes an oxygen storage capacity (OSC) determining module that determines an OSC period based on the corrected upstream transition period and the downstream transition period. The system includes a catalyst fault detection module that selectively adjusts operating parameters of an engine of the vehicle based on the OSC period.

In other features, the system includes a catalyst test module that selectively commands the rich-to-lean fueling transition. The rich-to-lean fueling transition is a transition from a fuel rich state to a fuel lean state. The fuel rich state is detected by the upstream oxygen sensor when a first measured oxygen concentration of the exhaust crosses a first predetermined value. The fuel lean state is detected by the upstream oxygen sensor when a second measured oxygen concentration of the exhaust crosses a second predetermined value.

In other features, the upstream oxygen monitoring module sets the upstream transition period to a difference between a first time based on when the rich-to-lean fueling transition is commanded and a second time at which the upstream oxygen sensor detects the fuel lean state. In other features, the first time is a time when a predetermined number of cylinders of the engine have been deactivated. In other features, the downstream oxygen monitoring module sets the downstream transition period to a difference between a first time based on when the rich-to-lean fueling transition is commanded and a third time at which the downstream oxygen sensor detects the fuel lean state.

In other features, the delay determining module determines the delay period using an exhaust system performance diagnostic based on at least one of catalyst temperature, intake air temperature, and mass airflow. In other features, the exhaust system performance diagnostic begins when a predetermined number of cylinders of the engine have been deactivated. The exhaust system performance diagnostic terminates when the upstream oxygen sensor detects a fuel lean state. In other features, the exhaust system performance diagnostic includes at least one table of calibrated values indexed by catalyst temperature, intake air temperature, and mass air flow.

In other features, the upstream correcting module sets the corrected upstream transition period to a difference of the upstream transition period and the delay period. In other features, the OSC module sets the OSC period to a difference between the corrected upstream transition period and the downstream transition period. In other features, the system includes a correcting module that determines a corrected OSC period based on the OSC period and based on catalyst temperature and altitude, an expected OSC module that determines an expected OSC period, a normalizing module that determines an OSC ratio based on the corrected OSC period and the expected OSC period, and a ratio filtering module that determines a filtered OSC ratio based on the OSC ratio.

In other features, the correcting module determines the corrected OSC by (i) determining a correction factor using a calibration table of correction factor values indexed by catalyst temperature and altitude, and (ii) multiplying the OSC period by the correction factor. The expected OSC module determines the expected OSC period using a calibration table of expected OSC indexed by catalyst temperature and mass air flow. The normalizing module determines the OSC ratio by dividing the corrected OSC period by the expected OSC period. The ratio filtering module determines the filtered OSC ratio using an exponentially weighted moving average filter.

A system for a vehicle includes a catalyst test module that selectively commands a fueling transition from a fuel rich state to a fuel lean state. The system includes an upstream oxygen monitoring module that monitors an upstream oxygen sensor and sets an upstream transition period to the difference between the response of the upstream oxygen sensor to the rich-to-lean fueling transition and the time at which the rich-to-lean fueling transition was commanded. The upstream oxygen sensor monitors an exhaust prior to an engine catalyst. The system includes a delay determining module that determines a delay period associated with a response of the upstream oxygen sensor to the rich-to-lean fueling transition based on catalyst temperature, intake air temperature, and mass air flow. The system includes an upstream correcting module that determines a corrected upstream transition period by subtracting the delay period from the upstream transition period. The system includes a downstream oxygen monitoring module that monitors a downstream oxygen sensor and sets a downstream transition period to the difference between the response of the downstream oxygen sensor to the rich-to-lean fueling transition and the time at which the rich-to-lean fueling transition was commanded. The downstream oxygen sensor monitors the exhaust following the engine catalyst. The system includes an oxygen storage capacity (OSC) determining module that sets a OSC period to the difference between the downstream transition period and the corrected upstream transition period. The system includes a correcting module that determines a corrected OSC period by (i) determining a correction factor using a calibration table of correction factor values indexed by catalyst temperature and altitude, and (ii) multiplying the OSC period by the correction factor. The system includes an expected OSC module that determines an expected OSC period using a calibration table of expected OSC indexed by catalyst temperature and mass air flow. The system includes a normalizing module that sets an OSC ratio to the corrected OSC period divided by the expected OSC period. The system includes a ratio filtering module that determines a filtered OSC ratio using an exponentially weighted moving average filter. The system includes a catalyst fault detection module that selectively adjusts operating parameters of an engine of the vehicle based on the filtered OSC ratio.

A method includes commanding a fueling transition from a fuel rich state to a fuel lean state and determining an upstream transition period based on the response of an upstream oxygen sensor to the rich-to-lean fueling transition. The upstream oxygen sensor monitors an exhaust stream prior to an engine catalyst of a vehicle. The method further includes determining a delay period associated with a response of the upstream oxygen sensor to the rich-to-lean fueling transition. The method further includes determining a corrected upstream transition period based on the upstream transition period and the delay period. The method further includes determining a downstream transition period based on the response of a downstream oxygen sensor to a rich-to-lean fueling transition. The downstream oxygen sensor monitors the exhaust stream following the engine catalyst. The method further includes determining an oxygen storage capacity (OSC) period based on the corrected upstream transition period and the downstream transition period. The method further includes detecting a fault in a catalyst based on the OSC period. The method further includes selectively adjusting operating parameters of an engine of the vehicle.

In other features, the method includes correcting the OSC period by (i) determining a correction factor using a calibration table of correction factor values indexed by catalyst temperature and altitude, and (ii) multiplying the OSC period by the correction factor. The method includes determining an expected OSC period by using a calibration table of expected OSC values indexed by catalyst temperature and mass air flow. The method includes normalizing the corrected OSC period by dividing the corrected OSC period by the expected OSC period. The method includes determining a filtered OSC ratio from the normalized OSC period using an exponentially weighted moving average filter.

In other features, the delay period is determined using an exhaust system performance diagnostic that begins when a predetermined number of cylinders of the engine have been deactivated and terminates when the upstream oxygen sensor detects a fuel lean state. The exhaust system performance diagnostic is based on catalyst temperature, intake air temperature, and mass air flow. The corrected upstream transition period is determined by taking the difference of the upstream transition period and the delay period.

In other features, the method includes correcting the OSC period by (i) determining a correction factor using a calibration table of correction factor values indexed by catalyst temperature and altitude, and (ii) multiplying the OSC period by the correction factor. In other features, the method includes determining an expected OSC period by using a calibration table of expected OSC values indexed by catalyst temperature and mass air flow. In other features, the method includes normalizing the corrected OSC period by dividing the corrected OSC period by the expected OSC period. In other features, the method includes determining a filtered OSC ratio from the normalized OSC period using an exponentially weighted moving average filter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine of a vehicle outputs exhaust to a catalyst or a series of catalysts. Exhaust gas reacts with one or more components of a catalyst to reduce harmful emissions. A catalyst utilizes stored oxygen for the chemical conversion when the exhaust is oxygen lean, fuel rich. A catalyst replenishes consumed oxygen while the exhaust is fuel lean, oxygen rich. The functionality of a catalyst is measured by the catalyst's ability to store oxygen. A catalyst's ability to store oxygen is indicated by the catalyst's oxygen storage capacity (OSC). A catalyst's ability to store oxygen may deteriorate over time.

The fuel lean and fuel rich states are relative to the preferred stoichiometric state. A stoichiometric operating state represents the preferred fuel to air ratio. Oxygen concentrations correspond to detected voltages. A detected voltage will be greater for an oxygen deficient state (fuel rich state) than for an oxygen rich state (fuel lean state). In other embodiments, the detected voltage may be greater for an oxygen rich state (fuel lean state) than for an oxygen deficient state (fuel rich state).

A primary oxygen sensor is located upstream of a catalyst ("pre-sensor"). A second oxygen sensor is located downstream of a catalyst ("post-sensor"). These sensors are utilized by an engine control module (ECM) to monitor the function of a catalyst. Broadly, the ECM controls operation of the engine. For example, the ECM controls fueling of the engine. Under some circumstances, the ECM may initiate a transition from a fuel rich state to a fuel lean state. The ECM may transition the fueling of the engine from fuel rich to fuel lean in order to determine whether a fault is present in an oxygen sensor and/or to determine whether a fault is present in a catalyst.

The ECM may trigger a fuel transition to determine whether a fault is present in a catalyst when certain enabling conditions are present, for instance immediately prior to the system's natural entrance into a deceleration fuel cut off mode (DFCO). Alternatively, the ECM may trigger a fuel transition when certain speeds, manifold absolute pressures (MAP), and/or mass air flows (MAF) are recognized. DFCO occurs when it has been determined that less power is needed, for instance, when a driver releases the accelerator pedal to allow the vehicle to decelerate. While operating in a DFCO state, one or more cylinders may be deactivated.

The ECM determines whether a fault is present in a catalyst based on a filtered oxygen storage capacity (OSC) ratio. The filtered OSC ratio is based upon the determined OSC period. The OSC period is the difference between the response of the post-sensor and pre-sensor to a lean state following the ECM initiated rich-to-lean fuel transition. Response to a lean state occurs when the voltages detected by the respective sensors are less than a predetermined value. A delay in the response of either the pre-sensor or the post-sensor to a lean state may result in a faulty determination of the OSC period. Therefore, a delay in either sensor may affect the ECM's ability to correctly identify a fault and a failure in a catalyst.

The ECM of the present disclosure monitors the performance of the upstream oxygen sensor in order to determine if there is a delay in the upstream oxygen sensor's response to a lean state following the initiated rich-to-lean fuel transition. If a delay exists, the upstream transition period will be corrected using the determined delay. The corrected upstream transition period will then be used to compute an OSC period, which is used to determine the filtered OSC ratio. The filtered OSC ratio is used to determine if a fault is present in a catalyst. If a fault is repetitive, failure of a catalyst may be indicated by a malfunction indicator lamp.

Figure 1:
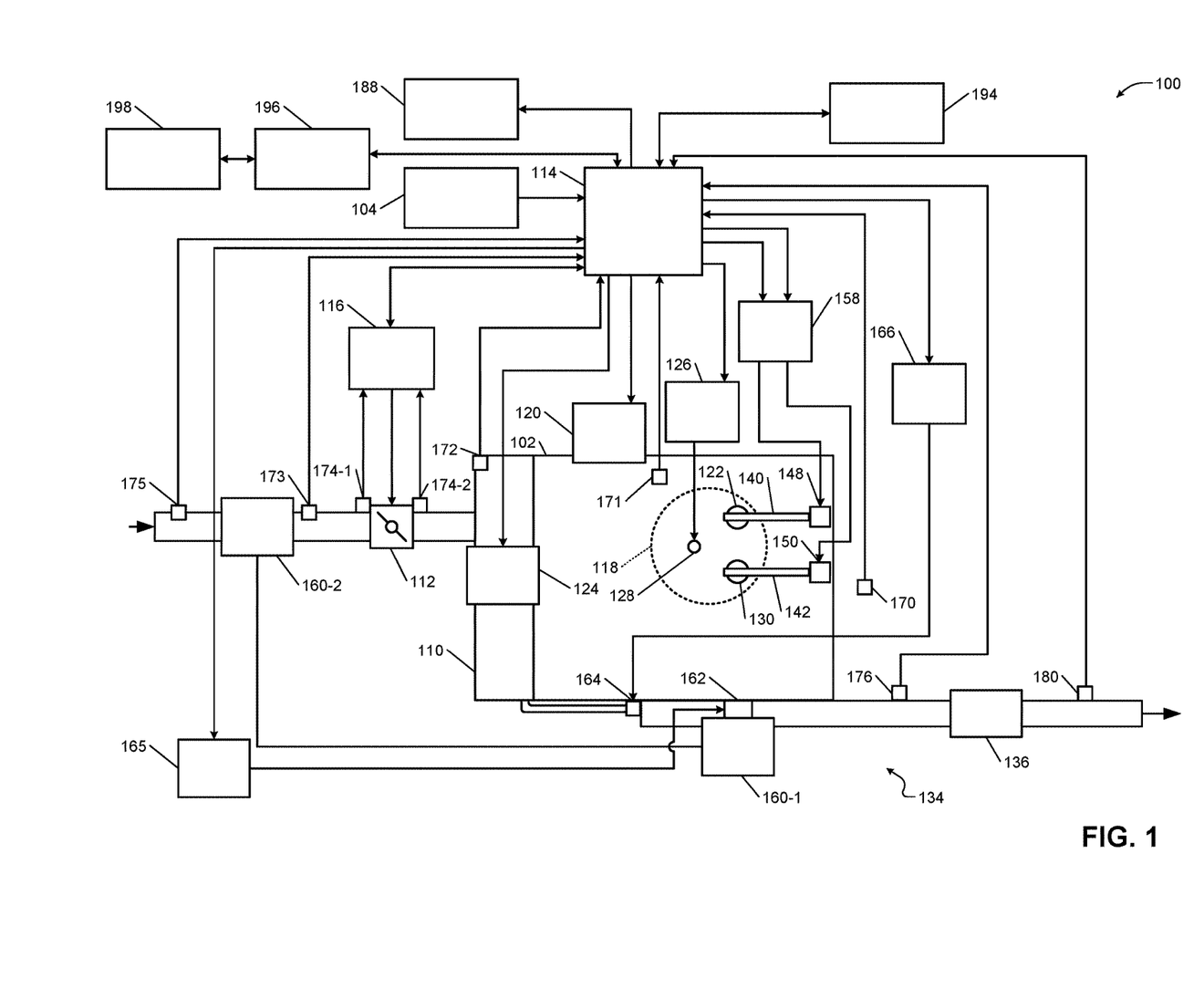
FIG. 1 is a functional block diagram of an example engine system according to the present disclosure.

FIG. 1 depicts a functional block diagram of an example engine system 100. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An ECM 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, 12, or another suitable number of cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the crankshaft angle. In various implementations, the spark actuator module 126 may halt provision of spark to deactivated cylinders.

Generating spark may be referred to as a firing event. The spark actuator module 126 may have the ability to individually vary the timing of each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through one or more exhaust valves, such as exhaust valve 130. The byproducts of combustion are exhausted from the vehicle via an exhaust system 134. The exhaust system 134 includes a catalyst 136, such as a three-way catalyst (TWC). The catalyst 136 reacts with one or more components of exhaust flowing through the catalyst 136. The catalyst 136 stores oxygen when the exhaust is fuel lean (oxygen rich).

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a turbine 160-1 that is powered by hot exhaust gases flowing through the exhaust system 134. The turbocharger also includes a cold-air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the cold-air compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

The engine system 100 may measure the speed of the crankshaft in revolutions per minute (RPM) using an RPM sensor 170. The temperature of the engine coolant may be measured using an engine coolant temperature (ECT) sensor 171. The ECT sensor 171 may be located within the engine 102 or at other locations where the coolant is circulated, such as a radiator (not shown).

The pressure within the intake manifold 110 may be measured using a manifold absolute pressure (MAP) sensor 172. In various implementations, engine vacuum, which is the difference between ambient air pressure and the pressure within the intake manifold 110, may be measured. The mass flow rate of air flowing into the intake manifold 110 may be measured using a mass air flow (MAF) sensor 173. In various implementations, the MAF sensor 173 may be located in a housing that also includes the throttle valve 112.

The throttle actuator module 116 may monitor the position of the throttle valve 112 using one or more throttle position sensors (TPS) 174. For example, first and second throttle position sensors 174-1 and 174-2 monitor the position of the throttle valve 112 and generate first and second throttle positions (TPS1 and TPS2), respectively, based on the throttle position. The ambient temperature of air being drawn into the engine 102 may be measured using an intake air temperature (IAT) sensor 175.

An upstream oxygen sensor 176, an upstream oxygen sensor, measures an amount (e.g., concentration) of oxygen in the exhaust flowing into the catalyst 136. A downstream oxygen sensor 180, a downstream oxygen sensor, measures an amount (e.g., concentration) of oxygen in the exhaust downstream of the catalyst 136. Oxygen concentrations correspond to determined voltages. A detected voltage will be greater for an oxygen deficient state (fuel rich state) than for an oxygen rich state (fuel lean state). In other embodiments, a determined voltage will be greater for an oxygen rich state (fuel lean state) than for an oxygen deficient state (fuel rich state).

Figure 2:
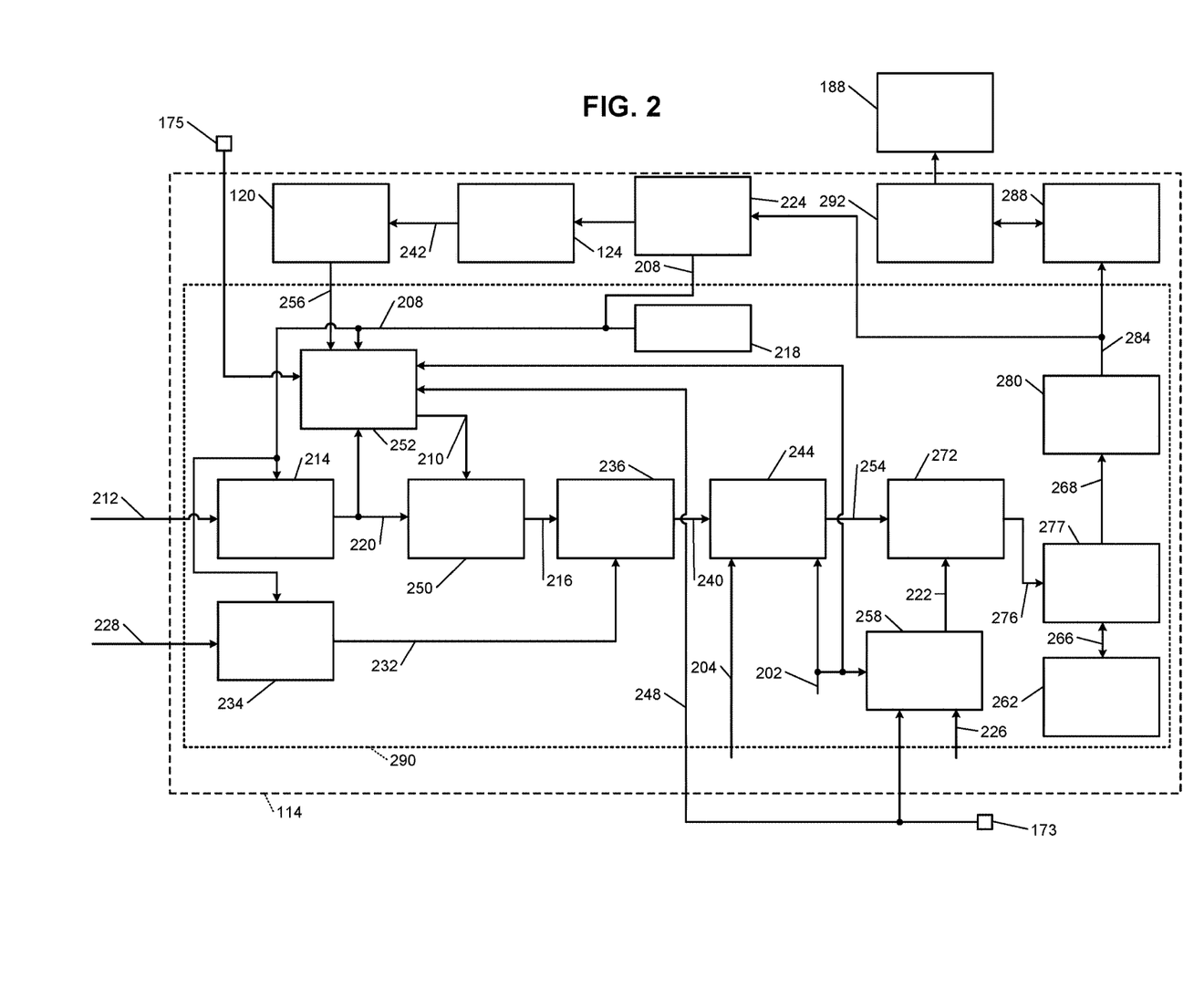
FIG. 2 is a functional block diagram of an example catalyst monitoring module within the engine control module (ECM) according to the present disclosure.

The ECM 114 may use signals from the sensors and/or one or more other sensors to make control decisions for the engine system 100 (see FIG. 2). The ECM 114 stores a fault code and will illuminate the malfunction indicator lamp 188 and indicate failure when a predetermine number of faults have been recorded and failure is indicated.

A transmission control module 194 may control operation of the transmission. The ECM 114 may communicate with the transmission control module 194 for various reasons, such as to share parameters and to coordinate engine operation with shifting gears in the transmission. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 165, and the EGR actuator module 166. For these actuators, the actuator values may correspond to a number of activated cylinders, fueling rate, intake and exhaust cam phaser angles, boost pressure, and EGR valve opening area, respectively. The ECM 114 may control actuator values in order to cause the engine 102 to generate a desired engine output torque.

FIG. 2 is a functional block diagram of an example catalyst monitoring module 290 within the ECM 114. A catalyst test module 218 generates a test indicator 208, which is transmitted to an actuating module 224, a delay determining module 252, an upstream oxygen monitoring module 214, and a downstream oxygen monitoring module 234. The catalyst test module 218, for example, may generate the test indicator 208 prior to the system's natural entrance into a deceleration fuel cut off mode (DFCO). DFCO is generally triggered when certain speeds, gears, and revolutions per minute (RPM) are obtained, or if the system is entering or has entered a deceleration state. When the predetermined enabling conditions are recognized, the catalyst test module 218 will transmit the test indicator 208.

Upon receipt of the test indicator 208, the actuating module 224 may transmit a signal to the fuel actuator module 124 in order to induce the fuel actuator module 124 to force the system rich relative to the preferred stoichiometric state. Relative rich and lean states are determined by industry standards. For example only, for a certain sensor, voltage of 450 mV for a measured oxygen concentration may be chosen as the stoichiometric boundary. This may also be the target voltage for closed loop fuel. Following inducement by the fuel actuator module 124, the system is considered to be operating at a rich state following a calibratrable delay period that begins when the voltage measured by the downstream oxygen sensor 180 is greater than a predetermined value. Including the calibratible delay before recognizing the system as running rich allows for thorough catalyst saturation. A 30-40% rich state is preferred.

Once a rich state is recognized, the system will be forced lean. For example only, to force the system lean, the fuel actuator module 124 may simply stop providing fuel. In another instance, the fuel actuator module 124 may transmit a cylinder deactivation indicator 242 to the cylinder actuator module 120, inducing the cylinder actuator module 120 to selectively deactivate some of the cylinders and transmit a cylinder deactivated indicator 256.

Upon receipt of the test indicator 208, an upstream oxygen monitoring module 214 may reset and start an internal upstream timer. Similarly, the downstream oxygen monitoring module 234 may reset and start an internal downstream timer upon receipt of the test indicator 208. Alternatively, the respective timers may be initiated when a rich state has been detected by the downstream oxygen sensor 180 following inducement. In another embodiment, the respective timers may be initiated when the rich-to-lean transition is commanded.

The upstream and downstream timers will run until a fuel lean (oxygen rich) exhaust state is detected. The timers will continue until the detected voltage is less than a predetermined value. The timer values are used to calculate an initial upstream transition period 220 and a downstream transition period 232, respectively. The transition periods may then be used to calculate an OSC period. A delay in the response of either sensor to a fuel lean state following initiation of a rich-to-lean transition may result in the determination of an incorrect OSC period. An incorrect OSC period may cause a catalyst fault to be erroneously indicated. Similarly, an atypically accelerated response by one of the sensors may lead to the determination of an incorrect OSC period. Therefore, any discussion in this disclosure of adjusting the OSC period or an individual sensor response time is understood to allow for adjustment in either direction depending on the implementation.

An upstream oxygen monitoring module 214 determines an initial upstream transition period 220 by taking the difference between the time at which the test indicator 208 was received and the time at which a fuel lean, oxygen rich state was measured by the upstream oxygen sensor 176. For example, the fuel lean, oxygen rich state is determined when the voltage corresponding to the oxygen concentration transitions from greater than to less than a predetermined value.

In this manner, the initial upstream transition period 220 indicates the period between the time when the transition from fuel rich to fuel lean was commanded (the time at which the test indicator 208 was received) and the time when the upstream oxygen sensor 176 indicated that the exhaust was fuel lean.

The downstream oxygen monitoring module 234 determines the downstream transition period 232 by taking the difference between the time at which the test indicator 208 was received and the time at which a fuel lean, oxygen rich state was measured by the downstream oxygen sensor 180. For example, the fuel lean, oxygen rich state is determined when the voltage corresponding to the oxygen concentration transitions from greater than to less than a predetermined value. In this manner, the downstream transition period 232 indicates the period between the time when the transition from fuel rich to fuel lean was commanded (the time at which the test indicator 208 was received) and the time when the downstream oxygen sensor 180 indicated that the exhaust was fuel lean.

A delay period 210 associated with the upstream oxygen sensor response to the fuel lean state may be determined by the delay determination module 252. The delay period 210 may be used to correct the initial upstream transition period 220, which is used to determine a corrected upstream transition period 216. The delay determining module 252 determines the delay period 210 of the upstream oxygen sensor using exhaust system performance diagnostics (ESPD). ESPD may be initiated when the cylinder actuator module 120 deactivates a predetermined number of cylinders.

The cylinder actuator module 120 will transmit the cylinder deactivated indicator 256 to the delay determining module 252 when a predetermined number of cylinders have been deactivated. For example only, the cylinder actuator module 120 may transmit the cylinder deactivated indicator 256 to the delay determining module 252 when two cylinders have been deactivated. ESPD will terminate when the upstream oxygen sensor 176 indicates that the exhaust is fuel lean, that is, when the upstream oxygen sensor transmits a voltage below a predetermined value.

An upstream correcting module 250 may determine a corrected upstream transition period 216 using an initial upstream transition period 220 and the delay period 210. For example, the upstream correcting module 250 may determine the corrected upstream transition period 216 by subtracting the delay period 210 from the initial upstream transition period 220.

In FIG. 2, an OSC module 236 determines an OSC period 240 using a corrected upstream transition period 216 and the downstream transition period 232. The OSC period 240 corresponds to an amount of oxygen that the catalyst 136 is capable of storing. The OSC module 236 may set the OSC period 240 to the difference between the downstream oxygen sensor's response to a fuel transition and the upstream oxygen sensor's response to a fuel transition. In this manner, the OSC period 240 is determined by taking the difference between the corrected upstream transition period 216 and the downstream transition period 232.

In the alternative, the correction for the delay associated with the upstream oxygen sensor may occur following the determination of an initial OSC period. For example, a corrected OSC period could be determined by adding the delay period 210 to an initial OSC period calculated by taking the difference between the downstream transition period 232 and the (uncorrected) initial upstream transition period 220. Additionally, the correction for delay association with the pre-catalyst sensor may be accompanied by an additional correction for any delay associated with the response of the downstream oxygen sensor to the fuel lean state. See U.S. application Ser. No. 13/221,135, filed Aug. 30, 2011, the entire disclosure of which is incorporated by reference.

Once the OSC period 240 is determined, a correcting module 244 determines a corrected OSC period 254. For example, the correcting module 244 may determine a corrected OSC period as a function of the system's altitude 204 and catalyst temperature 202. These corrections may be needed because, for instance, hot catalysts store more oxygen. As such, a system running with a hot catalyst may compute an artificially high OSC period. Catalyst temperature 202 may be determined using a continuous open-loop model based on the air-to-fuel ratio, MAF 248, and engine pressure variables.

Varying altitudes 204 may affect the OSC period 240 determinations because of the amount of atmospheric oxygen available to the system. It is a possibility that the lower the amount of atmospheric oxygen—that is, the higher the altitude—the greater the OSC period 240 because of the greater required time for a catalyst to recapture the oxygen lost following the rich-to-lean transition. Altitude 204 may be determined using a system's barometric sensor. When no barometric pressure sensor exists, barometric pressure may be determined based on values of manifold absolute pressure. For example only, the correcting module 244 may increase the OSC period 240 as the catalyst temperature 202 increases, or decreases the OSC period 240 as the altitude 204 increases.

An expected OSC module 258, using a set of stored calibration tables, may identify an expected OSC 222 resulting from the system's present operating conditions. The calibration tables may be indexed by catalyst temperature, engine RPM 226, and MAF 248. The normalizing module may compare the expected OSC 222 to the corrected OSC period 254 to determine an OSC ratio 276. For example only, the normalizing module 272 may determine the OSC ratio 276 based on the equation:

$$OSC \text{ Ratio } 276 = \frac{\text{Corrected } OSC \text{ Period } 254}{\text{Expected } OSC \text{ Period } 222} \quad (1)$$

A ratio filtering module 277 may apply a filter to the OSC ratio 276 to generate a filtered OSC ratio 268. For example, the filter may be an exponentially weighted moving average (EWMA) filter. The ratio filtering module 277 may generate the filtered OSC ratio 268 based on an EWMA filter including the present value of the OSC ratio 276 and M previous values 266 of the OSC ratio 276 from M previous rich-to-lean transitions, where M is an integer greater than zero. The M previous values 266 are stored within a historical storage module 262 and may represent all determined filtered OSC ratios for a designated period of time.

A catalyst fault detection module 280 determines whether a fault is present in the catalyst 136 based on the filtered OSC ratio 268. A fault may indicate that the ability of the catalyst 136, to store oxygen is less than an acceptable level. For example, the catalyst fault detection module 280 may determine that a fault is present in the catalyst 136 when the filtered OSC ratio 268 drops below a predetermined value. Conversely, the catalyst fault detection module 280 may determine that a fault is not present in the catalyst 136 when the filtered OSC ratio 268 is greater than the predetermined value.

The catalyst fault detection module 280 may selectively take one or more remedial actions when fault is present in the catalyst 136. For example, the catalyst fault detection module 280 may selectively adjust one or more engine operating parameters. For example, fueling changes may be induced as a result of the filtered OSC ratio 268. The catalyst fault detection module 280 may additionally or alternatively store a catalyst fault indicator 284 in the system's fault storage 288. The catalyst fault indicator 284 may include, for example, a predetermined diagnostic trouble code (DTC). A fault monitoring module 292 may monitor the fault storage 288 and illuminate an indicator, such as a malfunction indicator lamp (MIL) 188, to indicate catalyst failure when a fault in the catalyst 136 has been indicated a predetermined number of times. For example, three, four, five, or six instances of the filtered OSC ratio 268 falling below the predetermined value within a designated time period may cause the MIL 188 to illuminate.

Figure 3A:
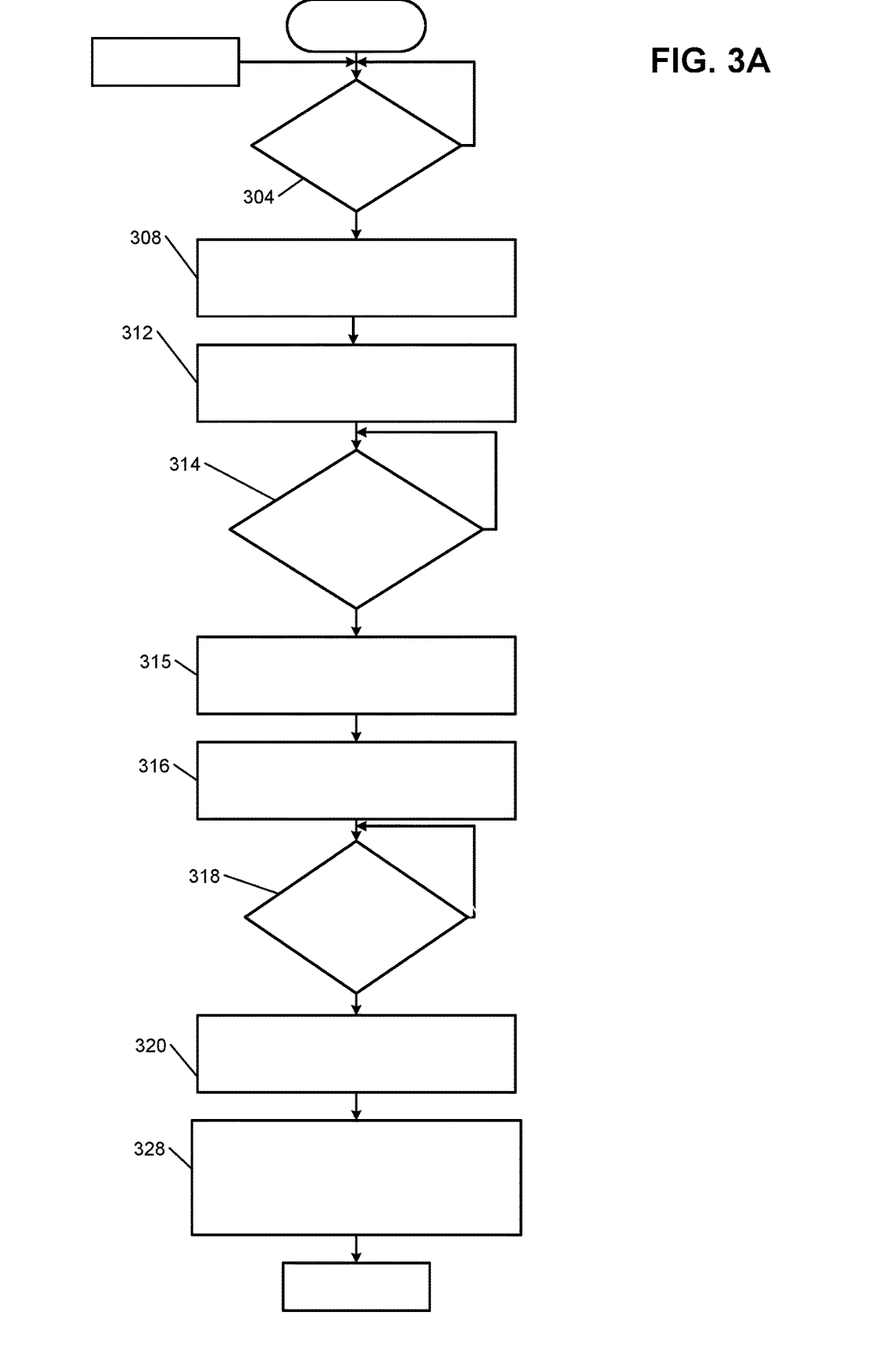
FIG. 3A, FIG. 3B, and FIG. 3C each depict portions of a flowchart that sets forth an example method of determining a filtered OSC ratio.
Figure 3B:
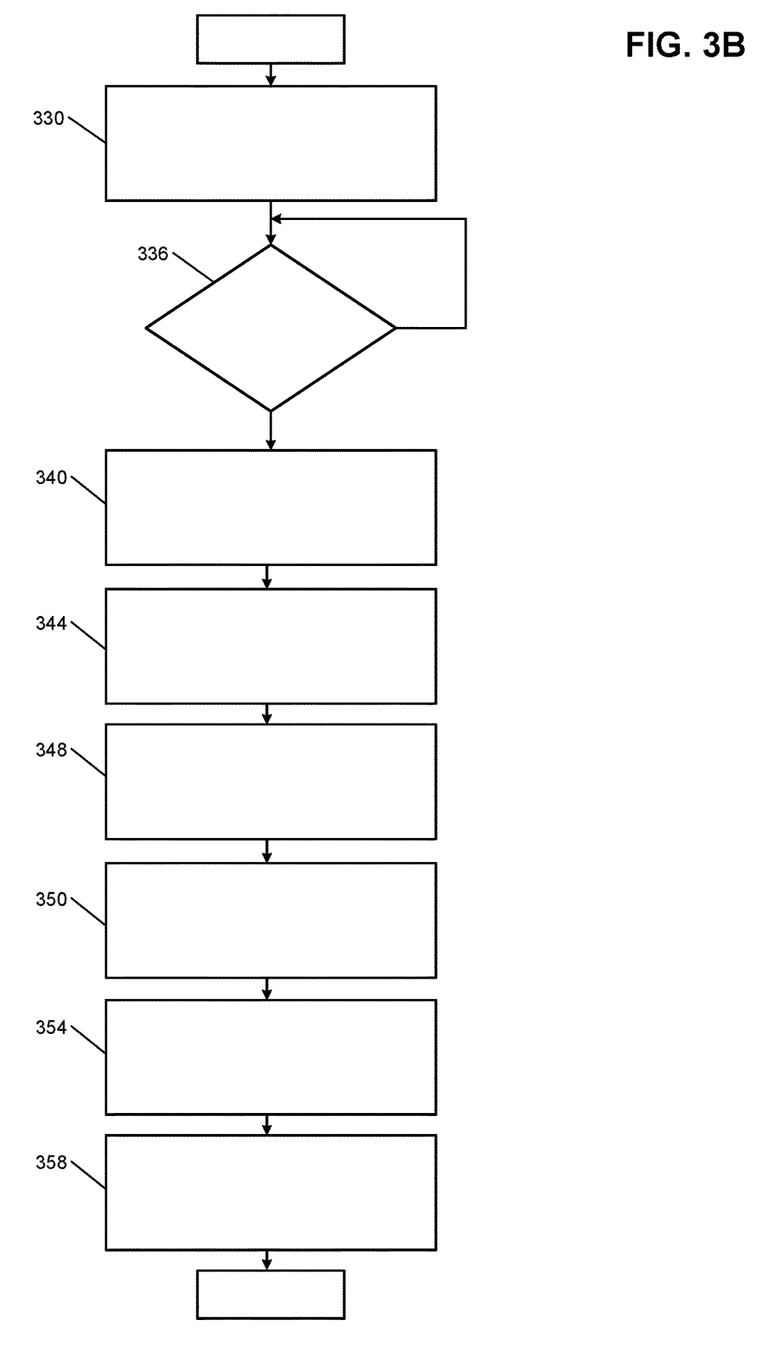
Figure 3C:
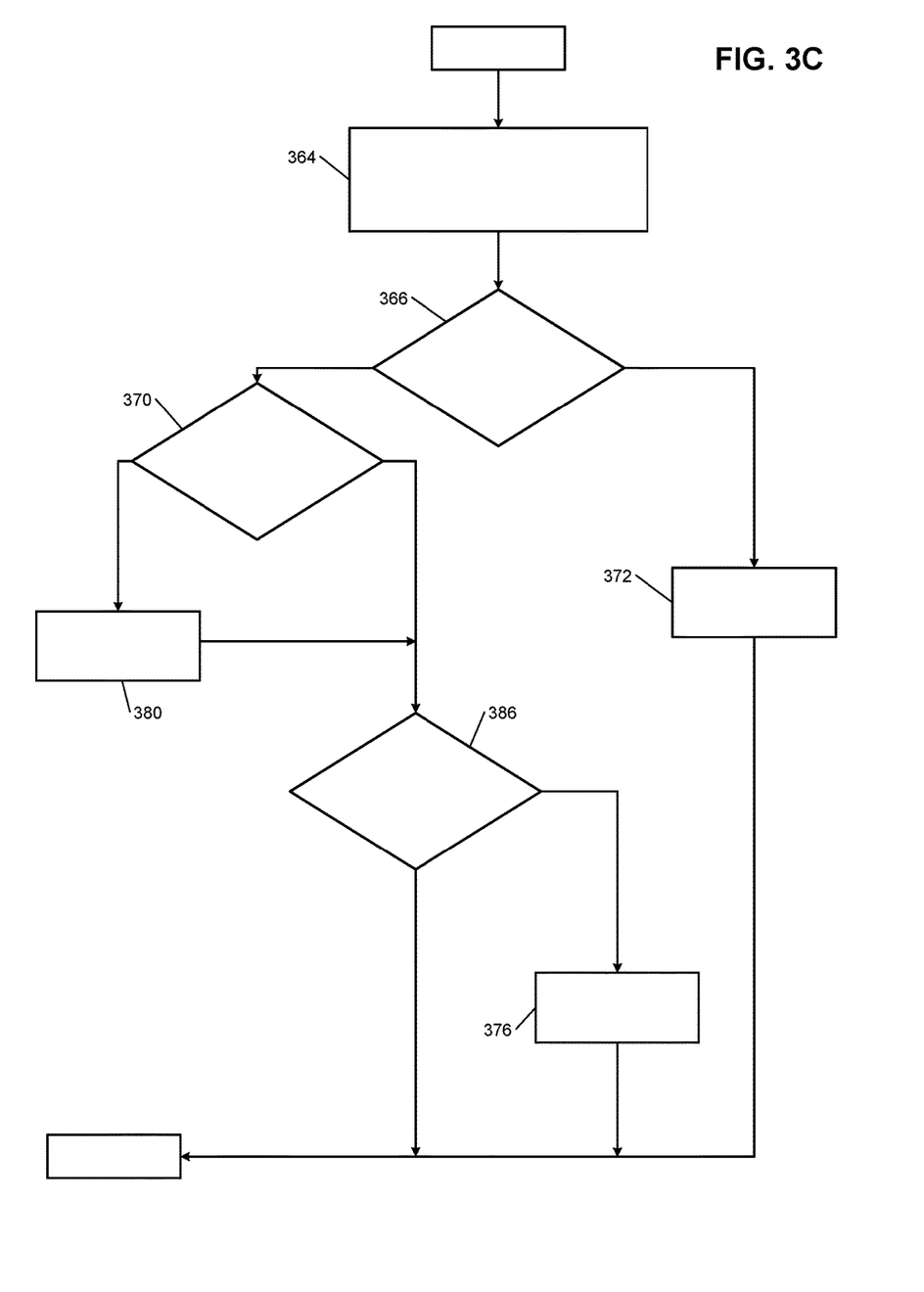

Referring now to FIGS. 3A, 3B, and 3C, a flowchart describes an example method of determining the filtered OSC ratio 268 and determining catalyst faults and failure.

In FIG. 3A, at 304, the catalyst test module 218 determines if one or more enabling conditions are satisfied. If the enabling conditions are not satisfied, the system will remain at 304. If the enabling conditions are satisfied, the catalyst test module 218 will, at 308, generate the test indicator 208. The test indicator 208 is transmitted to the actuating module 224, the delay determining module 252, an upstream oxygen monitoring module 214, and a downstream oxygen monitoring module 234.

At 312, upon receipt of the test indicator 208, the actuating module 224 will signal the fuel actuator module 124 to force the system rich. For example, the actuating module 224 may command a transition from a stoichiometric state to a fuel rich state. If at 314 it is determined that the system is rich, control waits for a predetermined period of time at 315 before continuing at 316. The fuel actuator module 124 will, at 316, command a rich-to-lean transition, causing the system to become lean. For example, the fuel actuator module 124 may transmit the cylinder deactivation indicator 242 to the cylinder actuator module 120, inducing the cylinder actuator module 120 to selectively deactivate some of the cylinders and transmit the cylinder deactivated indicator 256. Deactivating cylinders includes interrupting the supply of the fuel to those cylinders.

At 318, an upstream oxygen monitoring module 214 monitors whether the detected voltage corresponding to the exhaust's oxygen concentration 212 is less than a predetermined value. If so, control proceeds with 320; otherwise, control remains at 318. At 320, an upstream oxygen monitoring module 214 may set an initial upstream transition period 220 equal to the period between the time when the catalyst test module 218 commanded the fueling transition—that is, the time when the catalyst test module 218 transmitted the test indicator 208—and the time when the voltage detected by the upstream oxygen sensor is less than the predetermined value and the fuel is considered lean. The upstream oxygen monitoring module 214 will store the determined upstream transition period value at 320.

At 328, the delay determining module 252 will determined the delay period 210, if any, associated with the upstream oxygen sensor's 176 response to the fueling transitions using ESPD. ESPD may use calibrated tables indexed by MAF, IAT, and catalyst temperature.

In FIG. 3B, at 330, the upstream correcting module 250 will determine a corrected upstream transition period 216 by setting the corrected upstream transition period to the difference of the initial upstream transition period 220 and the delay period 210.

At 336, the downstream oxygen monitoring module 234 monitors whether the voltage detected corresponding to the downstream oxygen concentration 228 is less than the predetermined value and is fuel lean. If the voltage is less than the predetermined value, the downstream oxygen monitoring module 234 will determine the downstream transition period 232 at 340. The downstream oxygen monitoring module 234 may set the downstream transition period 232 equal to the period between the time when the catalyst test module 218 commanded the fueling transition and the time when the voltage is less than the predetermined value and the fuel is considered to be lean. The downstream oxygen monitoring module 234 may store the downstream transition period 232.

At 344, the OSC module 236 may determine the OSC period 240 by setting the OSC period 240 to the difference between the downstream transition period 232 of 340 and the corrected upstream transition period 216 of 330. At 348, the correcting module 244 may determine a correction factor using a set of stored calibration tables indexed by system operating conditions. For instance, the calibration table or tables may be indexed by altitude and catalyst temperature.

At 350, the corrected OSC period may be determined by multiplying the OSC period 240 by the determined correction factor of 348. At 354, the expected OSC module 258 determines an expected OSC 222 by comparing the selected system operating conditions to a set of stored calibration tables. At 358, the OSC ratio 276 may be determined by dividing the corrected OSC period 254 by the expected OSC 222.

In FIG. 3C, at 364, the ratio filtering module 277 may determine the filtered OSC ratio 268 using an EWMA. At 366, the filtered OSC ratio 268 is compared to a predetermined value. If the filtered OSC ratio 268 is below the predetermined value, control transitions to 370. If the filtered OSC ratio 268 is above the predetermined value, the catalyst fault detection module 280, at 372, indicates that no fault is present in the catalyst. The fault detecting process restarts at 304, waiting for the appropriate enabling conditions to be present.

At 370, the catalyst fault detection module 280 may choose not to selectively change one or more of the engine's 102 operating parameters, such as fueling amount, fuel-air ratio, or spark advance. If the conditions are satisfied the operating parameters will be changed at 380. Control continues at 386.

The catalyst fault detection module 280 may choose to change operating parameters if a fault has been detected a predetermined number of times within a designated period. If a fault has been detected a predetermined number of times within a designated period of time catalyst failure may be indicated. At 386, if it is determined that the number of instances where the filtered OSC ratio has been below the predetermined value exceeds a predetermined number of instances, failure of the catalyst will be found. Therefore, a malfunction indicator lamp 188 may be illuminated at 376.

For example only, when the number of times the filtered OSC ratio has been below the predetermined value exceeds a predetermined maximum limit, failure of the catalyst will be found at 386, and a malfunction indicator lamp 188 will be illuminated at 376. If, at 386, the number of instances where the filtered OSC ratio has been below the predetermined value does not exceed the predetermined maximum limit, the fault detecting process will restart at 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A system for a vehicle, the system comprising:
an upstream oxygen monitoring module that monitors an upstream oxygen sensor and determines an upstream transition period based on a time at which the upstream oxygen sensor detects a rich-to-lean fueling transition, wherein the upstream oxygen sensor monitors an oxygen concentration of an exhaust stream prior to an engine catalyst;
a delay determining module that determines a delay period associated with the upstream oxygen sensor's detection of the rich-to-lean fueling transition;
an upstream correcting module that determines a corrected upstream transition period based on the upstream transition period and the delay period;
a downstream oxygen monitoring module that monitors a downstream oxygen sensor and determines a downstream transition period based on the response of the downstream oxygen sensor to the rich-to-lean fueling transition, wherein the downstream oxygen sensor monitors the oxygen concentration of the exhaust stream following the engine catalyst;
an oxygen storage capacity (OSC) determining module that determines an OSC period based on the corrected upstream transition period and the downstream transition period; and
a catalyst fault detection module that selectively adjusts operating parameters of an engine of the vehicle based on the OSC period.

2. The system of claim 1 further comprising a catalyst test module that selectively commands the rich-to-lean fueling transition,
wherein the rich-to-lean fueling transition is a transition from a fuel rich state to a fuel lean state,
wherein the fuel rich state is detected by the upstream oxygen sensor when a first measured oxygen concentration of the exhaust crosses a first predetermined value; and
wherein the fuel lean state is detected by the upstream oxygen sensor when a second measured oxygen concentration of the exhaust crosses a second predetermined value.

3. The system of claim 2 wherein the upstream oxygen monitoring module sets the upstream transition period to a difference between a first time based on when the rich-to-lean fueling transition is commanded and a second time at which the upstream oxygen sensor detects the fuel lean state.

4. The system of claim 3 wherein the first time is a time when a predetermined number of cylinders of the engine have been deactivated.

5. The system of claim 2 wherein the downstream oxygen monitoring module sets the downstream transition period to a difference between a first time based on when the rich-to-lean fueling transition is commanded and a third time at which the downstream oxygen sensor detects the fuel lean state.

6. The system of claim 1 wherein the delay determining module determines the delay period using an exhaust system performance diagnostic based on at least one of catalyst temperature, intake air temperature, and mass airflow.

7. The system of claim 6 wherein the exhaust system performance diagnostic begins when a predetermined number of cylinders of the engine have been deactivated, and wherein the exhaust system performance diagnostic terminates when the upstream oxygen sensor detects a fuel lean state.

8. The system of claim 6 wherein the exhaust system performance diagnostic includes at least one table of calibrated values indexed by catalyst temperature, intake air temperature, and mass air flow.

9. The system of claim 1 wherein the upstream correcting module sets the corrected upstream transition period to a difference of the upstream transition period and the delay period.

10. The system of claim 1 wherein the OSC module sets the OSC period to a difference between the corrected upstream transition period and the downstream transition period.

11. The system of claim 1 further comprising:
a correcting module that determines a corrected OSC period based on the OSC period and based on catalyst temperature and altitude;
an expected OSC module that determines an expected OSC period;
a normalizing module that determines an OSC ratio based on the corrected OSC period and the expected OSC period; and
a ratio filtering module that determines a filtered OSC ratio based on the OSC ratio.

12. The system of claim 11 wherein:
the correcting module determines the corrected OSC by (i) determining a correction factor using a calibration table of correction factor values indexed by catalyst temperature and altitude, and (ii) multiplying the OSC period by the correction factor;
the expected OSC module determines the expected OSC period using a calibration table of expected OSC indexed by catalyst temperature and mass air flow;
the normalizing module determines the OSC ratio by dividing the corrected OSC period by the expected OSC period; and
the ratio filtering module determines the filtered OSC ratio using an exponentially weighted moving average filter.

13. A system for a vehicle, the system comprising:
a catalyst test module that selectively commands a fueling transition from a fuel rich state to a fuel lean state;
an upstream oxygen monitoring module that monitors an upstream oxygen sensor and sets an upstream transition period to the difference between the response of the upstream oxygen sensor to the rich-to-lean fueling transition and the time at which the rich-to-lean fueling transition was commanded, wherein the upstream oxygen sensor monitors an exhaust prior to an engine catalyst;
a delay determining module that determines a delay period associated with a response of the upstream oxygen sensor to the rich-to-lean fueling transition based on catalyst temperature, intake air temperature, and mass air flow;
an upstream correcting module that determines a corrected upstream transition period by subtracting the delay period from the upstream transition period;
a downstream oxygen monitoring module that monitors a downstream oxygen sensor and sets a downstream transition period to the difference between the response of the downstream oxygen sensor to the rich-to-lean fueling transition and the time at which the rich-to-lean fueling transition was commanded, wherein the downstream oxygen sensor monitors the exhaust following the engine catalyst;
an oxygen storage capacity (OSC) determining module that sets a OSC period to the difference between the downstream transition period and the corrected upstream transition period;
a correcting module that determines a corrected OSC period by (i) determining a correction factor using a calibration table of correction factor values indexed by catalyst temperature and altitude, and (ii) multiplying the OSC period by the correction factor;
an expected OSC module that determines an expected OSC period using a calibration table of expected OSC indexed by catalyst temperature and mass air flow;
a normalizing module that sets an OSC ratio to the corrected OSC period divided by the expected OSC period;
a ratio filtering module that determines a filtered OSC ratio using an exponentially weighted moving average filter; and
a catalyst fault detection module that selectively adjusts operating parameters of an engine of the vehicle based on the filtered OSC ratio.

14. A method comprising:
commanding a fueling transition from a fuel rich state to a fuel lean state;
determining an upstream transition period based on the response of an upstream oxygen sensor to the rich-to-lean fueling transition, wherein the upstream oxygen sensor monitors an exhaust stream prior to an engine catalyst of a vehicle;
determining a delay period associated with a response of the upstream oxygen sensor to the rich-to-lean fueling transition;
determining a corrected upstream transition period based on the upstream transition period and the delay period;
determining a downstream transition period based on the response of a downstream oxygen sensor to a rich-to-lean fueling transition, wherein the downstream oxygen sensor monitors the exhaust stream following the engine catalyst;
determining an oxygen storage capacity (OSC) period based on the corrected upstream transition period and the downstream transition period;
detecting a fault in a catalyst based on the OSC period; and
selectively adjusting operating parameters of an engine of the vehicle.

15. The method of claim 14 further comprising:
correcting the OSC period by (i) determining a correction factor using a calibration table of correction factor values indexed by catalyst temperature and altitude, and (ii) multiplying the OSC period by the correction factor;
determining an expected OSC period by using a calibration table of expected OSC values indexed by catalyst temperature and mass air flow;
normalizing the corrected OSC period by dividing the corrected OSC period by the expected OSC period; and
determining a filtered OSC ratio from the normalized OSC period using an exponentially weighted moving average filter.

16. The method of claim 14, wherein:
the delay period is determined using an exhaust system performance diagnostic that begins when a predetermined number of cylinders of the engine have been deactivated and terminates when the upstream oxygen sensor detects a fuel lean state;

the exhaust system performance diagnostic is based on catalyst temperature, intake air temperature, and mass air flow; and the corrected upstream transition period is determined by taking the difference of the upstream transition period and the delay period.

17. The method of claim 16 further comprising correcting the OSC period by (i) determining a correction factor using a calibration table of correction factor values indexed by catalyst temperature and altitude, and (ii) multiplying the OSC period by the correction factor.

18. The method of claim 17 further comprising determining an expected OSC period by using a calibration table of expected OSC values indexed by catalyst temperature and mass air flow.

19. The method of claim 18 further comprising normalizing the corrected OSC period by dividing the corrected OSC period by the expected OSC period.

20. The method of claim 19 further comprising determining a filtered OSC ratio from the normalized OSC period using an exponentially weighted moving average filter.

* * * * *